United States Patent Office 3,482,418
Patented Dec. 9, 1969

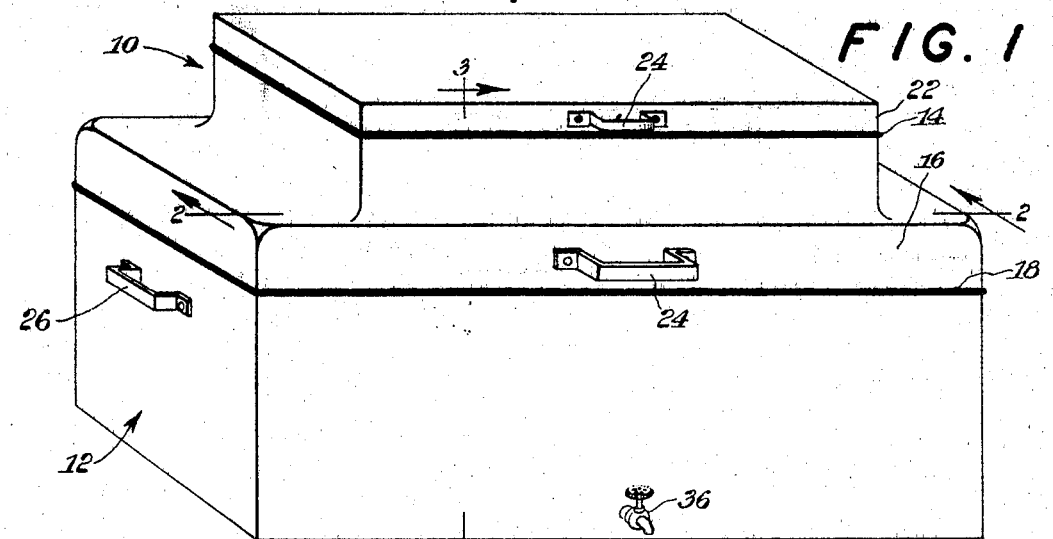
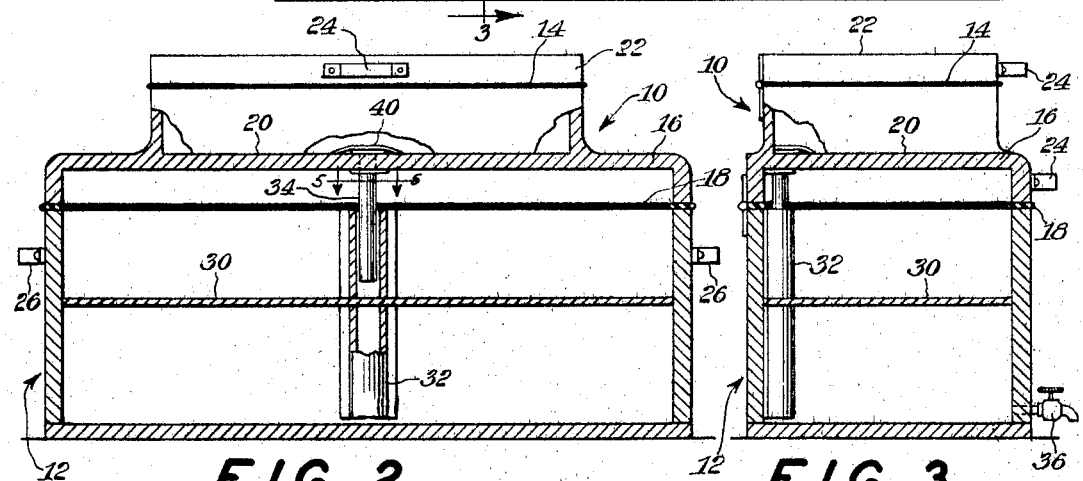
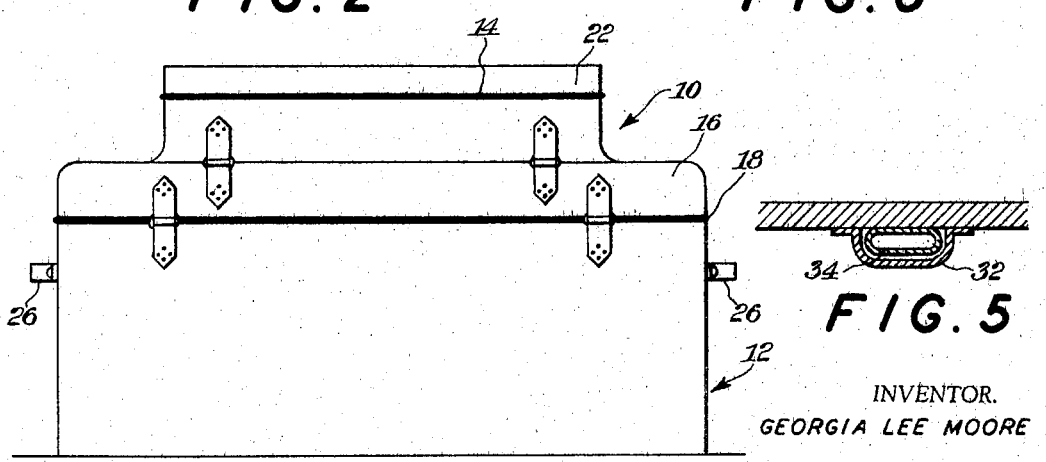
INVENTOR.
GEORGIA LEE MOORE

---

3,482,418
FOOD STORAGE APPARATUS
Georgia Lee Moore, 2610 Mierianne,
Houston, Tex. 77016
Filed Apr. 15, 1968, Ser. No. 728,100
Int. Cl. F25d 3/08
U.S. Cl. 62—457                       2 Claims

ABSTRACT OF THE DISCLOSURE

An insulated food storage apparatus for storing food either hot or cold and maintaining same at initial storage temperature for a desired period, and to provide new and improved storage apparatus of the character indicated containing two vertically stacked food storage chests in an integral structure which when used for storing cold foods also contains means for generating and storing cold water for use in drinking and other purposes.

SUMMARY OF THE INVENTION

An insulated food chest having a superimposed storage compartment on a storage compartment, and having a water storage area beneath said compartments, and means for selectively draining the water from the upper compartment to the lowermost compartment.

BRIEF DESCRIPTION OF THE DRAWINGS

FIG. 1 is a perspective view of my apparatus;
FIG. 2 is a cross sectional view through 2—2 in FIG. 1;
FIG. 3 is a cross sectional view through 3—3 in FIG. 1;
FIG. 4 is a rear view of my apparatus; and
FIG. 5 is a cross sectional view through 5—5 in FIG. 4.

DESCRIPTION OF THE PREFERRED EMBODIMENT

Referring now to FIGS. 1–5, there is shown an upper chest 10 and a lower chest 12, these chests being rectangular hollow insulated parallelpipeds and stacked one above the other. The width and length and depth of chest 10 are respectively smaller than the width, length and depth of chest 12.

Chest 10 has a top lid or access cover 22 hingedly secured to a side wall thereof and a horizontal peripherally disposed rubber seal or gasket 14 therefore. Chest 12 has a top end or access cover 16 hingedly secured to a side wall thereof and another horizontal peripherally disposed rubber seal 18. The bottom 20 of chest 10 is centered as an integral with cover 16 whereby cover 16 can only be lifted by swinging the entire chest 10 upward. Each cover 22 and 16 has a horizontal handle 24 and in addition chest 12 has two side horizontal handles 26.

Chest 12 has a horizontal partition 30 extending within this chest intermediate the cover 16 and the bottom 28 thereof. A vertical hollow conduit 32 open at both ends extends between the chests. A hollow flexible flat tube 34 open at both ends extends in conduit 32 between the top surface of bottom 20 and above but adjacent bottom 28. A drain valve 36 is mounted in the front wall of chest 12. If necessary, the bottom end of tube 34 can be sealed and connected via a suitable aperture to one end of a hollow horizontal feed pipe, the other end of pipe being connected to valve 36. The upper end of tube 34 can be temporarily sealed by a removable stopper 40.

In use for chilling food, the upper chest can be filled with ice. Sandwiches and the like can be stored upon partition 30. With the stopper removed, the ice will gradually melt and produce ice water which will flow downward through the tube into the lower part of the chest, where it can be collected and used via the drain valve. The food can be stored hot by omitting the ice. The stopper is to be used when ice water is not to be collected.

While I have described my invention with particular reference to the drawings, my protection is to be limited only by the terms of the claims which follow.

Having thus described my invention, I claim as new and desire to secure by Letters Patent:

1. A device for maintaining foods in either hot or cold condition comprising first and second insulated chests secured to each other and stacked one above the other, each chest having a top hinged door, the bottom of the upper chest serving as part of the top door of the lower chest, said chests containing in common a pair of vertical hollow tubes open at both ends, the upper end of one tube being disposed in the upper chest adjacent but above the bottom thereof, and telescoping within the other tube and the bottom of the other tube being disposed in the lower chest adjacent but above the bottom of the lower chest.

2. The device set forth in claim 1 wherein the said tube in the upper chest is flexible.

References Cited

UNITED STATES PATENTS

| | | | |
|---|---|---|---|
| 262,622 | 8/1882 | Schafhans | 62—463 |
| 400,768 | 4/1889 | Hohmeier et al. | 62—460 |
| 1,369,367 | 2/1921 | Thomson | 62—463 |
| 2,400,742 | 5/1946 | Clerc | 62—371 |

LLOYD L. KING, Primary Examiner

U.S. Cl. X.R.
62—460, 463